April 9, 1929.  F. TATAY  1,708,807
WATER AND AIR POWER DEVICE
Filed March 7, 1928
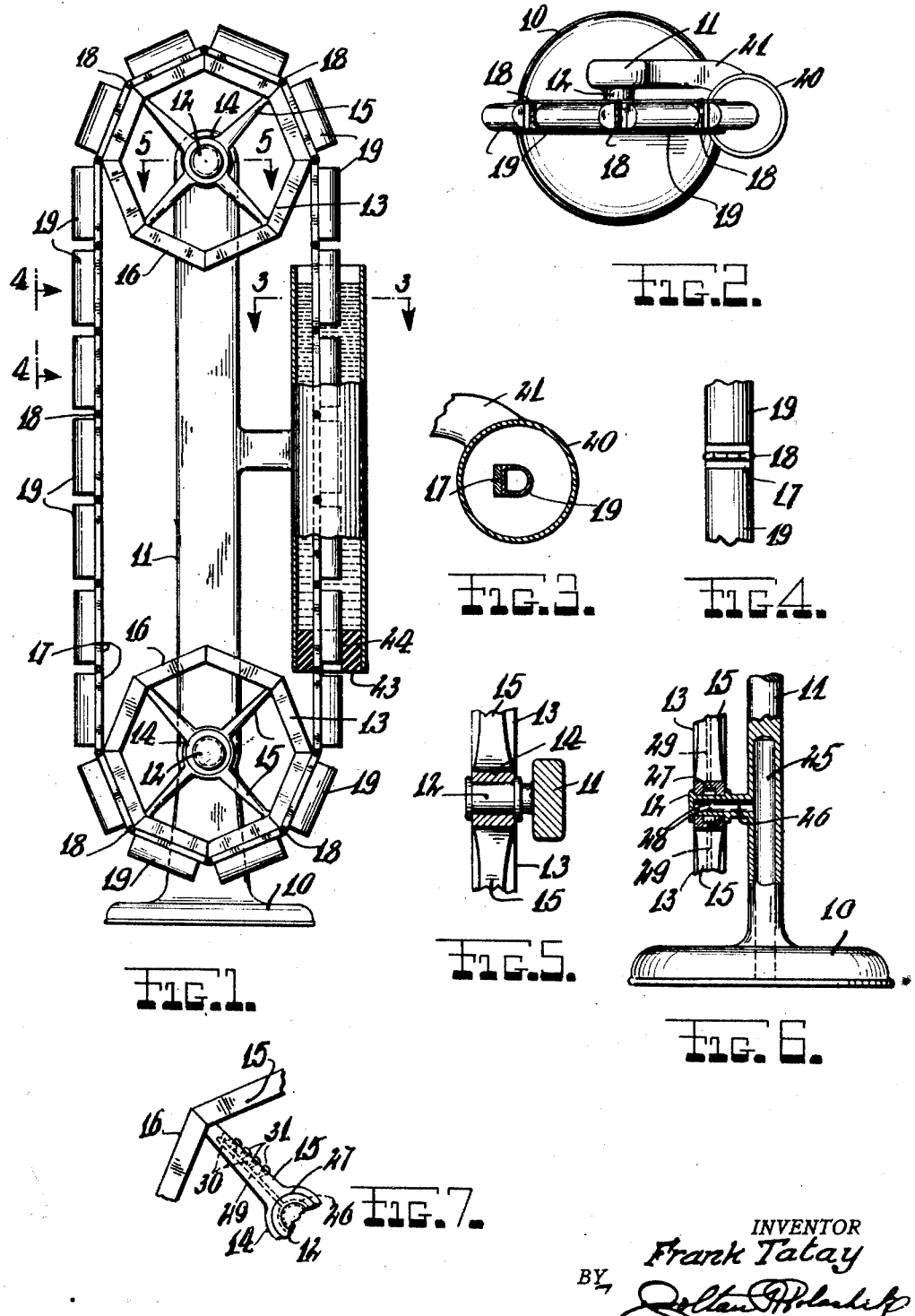
INVENTOR
Frank Tatay
BY
ATTORNEY Patented Apr. 9, 1929.

1,708,807

UNITED STATES PATENT OFFICE.

FRANK TATAY, OF NEW YORK, N. Y.

WATER AND AIR POWER DEVICE.

Application filed March 7, 1928. Serial No. 259,682.

This invention relates generally to novelty devices, and has more particular reference to a device of that nature which apparently operates by floats passing thru a tube of water.

The invention has for an object the provision of a device of the class mentioned which is of simple durable construction, desirable and efficient in action, and which can be manufactured and sold at a reasonable cost.

The device consists of an upper wheel with a plurality of flat sides, and a lower wheel similarly constructed. These wheels are rotatively supported on a suitable bracket. A continuous chain is engaged on these wheels, and consists of straight links of lengths equal to the flat sides of the wheels, pivotally connected together. An air tank or similar float is attached to each link of the chain. A glass tube surrounds a vertical portion of the chain, and the lower end of the tube is provided with a means for holding water in the tube and permitting the chain to move thru the tube. Water is placed in the tube, and there is an urge for the float in the tube to rise. A means for rotating the wheels is provided, and the device is set into operation, new floats enter the bottom of the tube as other floats leave the top of the tube.

For further comprehension of the invention, and of the objects and advantages thereof, reference will be had to the following description and accompanying drawings, and to the appended claims in which the various novel features of the invention are more particularly set forth.

In the accompanying drawing:

Fig. 1 is an elevational view of a device constructed according to this invention.

Fig. 2 is a plan view thereof.

Fig. 3 is a fragmentary horizontal sectional view, taken on the line 3—3 of Fig. 1.

Fig. 4 is a fragmentary end elevational view of the chain, looking in the direction of the line 4—4 of Fig. 1.

Fig. 5 is a fragmentary horizontal sectional view, taken on the line 5—5 of Fig. 1.

Fig. 6 is a fragmentary end elevational view of the device, partly shown in section.

Fig. 7 is a fragmentary front elevational detail view of the wheel shown in Fig. 6.

The reference numeral 10 indicates generally a stand provided with a vertical bar 11 having flanged horizontal members 12 projecting therefrom, and wheels 13 are rotatively mounted on the members 12. These wheels consist of hub members 14, spokes 15 and a rim 16 formed with a plurality of flat sides.

A continuous chain 17 is engaged on these wheels, and consists of straight links of lengths equal to the flat sides of the rim, pivotally connected together as indicated by numeral 18. An air tank 19 or similar float is attached to each of the links.

A glass tube 20 surrounds a vertical portion of the chain, and is thus held by a standard 21 projecting from the bar 11. The lower end of the tube is provided with some means for holding the water 22 in the tube and at the same time permitting the chain to move thru the tube, as for example a rubber stopper 23 with a central aperture 24 engaged in the tube.

An aperture 25 extends from the base 10 thru a portion of the bar 11, and communicates with an aperture 26 in the member 12. The hub 14 is formed with a circular cavity 27 and apertures 28 in the member 12, connect the cavity 27 and the aperture 26. The spokes 15 are formed with longitudinal apertures 29 communicating with the cavity 27. Along the length of the spokes there are a plurality of nozzle openings 30 communicating with the apertures 29, and normally closed by plugs 31, except one nozzle on each spoke which is left open. A compressed air supply may be connected with the passage 25, and a plug 31 may be removed from any of the nozzles and placed in the open nozzle, as a means for varying the rotation of the wheel, by changing the moment arms.

In operation, the wheels turn and the chain moves, and the device may be used in display windows.

While I have shown and described a preferred embodiment of my invention, it is to be understood that I do not limit myself to the precise construction herein disclosed and the right is reserved to all changes and modifications coming within the scope of the invention as defined in the appended claims.

Having thus described my invention what I claim as new and desire to secure by United States Letters Patent is:

1. A device of the class described, comprising spaced wheels, a continuous chain engaged thereon and arranged with a vertical portion, and provided with a plurality of floats connected along its length, a tube with water engaged over the said vertical portion of the chain, a means for holding the water within the tube, and permitting the chain to pass thru the tube, one of the said wheels being formed with hollow spokes arranged for connection with a supply of compressed air capable of operating the device, the said spokes being formed with a plurality of nozzle openings along their lengths, and plugs engageable in the nozzle openings for closing desired ones for varying the speed of operation of the device.

2. A device of the class described, comprising spaced wheels, a continuous chain engaged thereon and arranged with a vertical portion, and provided with a plurality of floats connected along its length, a tube with water engaged over the said vertical portion of the chain, a means for holding the water within the tube, and permitting the chain to pass thru the tube, one of the said wheels being formed with hollow spokes arranged for connection with a supply of compressed air capable of operating the device, the said spokes being formed with a plurality of nozzle openings along their lengths, arranged for closing, as desired for varying the speed of operation of the device.

In testimony whereof I have affixed my signature.

FRANK TATAY.